United States Patent
Hyung et al.

(10) Patent No.: US 7,811,697 B2
(45) Date of Patent: Oct. 12, 2010

(54) CYLINDRICAL LITHIUM ION SECONDARY BATTERY

(75) Inventors: Yooeup Hyung, Yongin-si (KR); Seokgyun Chang, Yongin-si (KR); Yongtae Kim, Yongin-si (KR); Sangbong Nam, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 606 days.

(21) Appl. No.: 11/647,048

(22) Filed: Dec. 27, 2006

(65) Prior Publication Data

US 2007/0154801 A1 Jul. 5, 2007

(30) Foreign Application Priority Data

Dec. 29, 2005 (KR) .................. 10-2005-0134533

(51) Int. Cl.
*H01M 2/00* (2006.01)
*H01M 1/34* (2006.01)
(52) U.S. Cl. ....................... 429/94; 429/180
(58) Field of Classification Search ................ 429/180, 429/94
See application file for complete search history.

(56) References Cited

U.S. PATENT DOCUMENTS 5,354,625 A * 10/1994 Bentz et al. ................ 429/17
2003/0148175 A1 * 8/2003 Iwanaga et al. ............ 429/130
2005/0238930 A1 * 10/2005 Yoshida et al. ............. 429/7
2005/0255380 A1 * 11/2005 Lasater et al. .............. 429/184

FOREIGN PATENT DOCUMENTS

| JP | 2005-251446 | * | 9/2005 |
| KR | 2003-0043745 | | 6/2003 |

OTHER PUBLICATIONS

Korean Patent Abstracts, Publication No. 1020030043745 A; Publication Date: Jun. 2, 2003; in the name of Masato Iwanaga et al.

* cited by examiner

*Primary Examiner*—Dah-Wei D Yuan
*Assistant Examiner*—Jacob Marks
(74) *Attorney, Agent, or Firm*—Christie, Parker & Hale, LLP

(57) ABSTRACT

A cylindrical lithium ion secondary battery includes a center pin fabricated with an inexpensive material and having a coating layer formed on the outer surface of the center pin. The cylindrical lithium ion secondary battery includes an electrode assembly having the center pin inserted through the center of the electrode. A case is provided for housing the electrode assembly and an electrolyte. A cap assembly seals the case. The center pin includes a body formed from a metallic material and a coating layer is formed on the outer surface of the body.

9 Claims, 8 Drawing Sheets

CYLINDRICAL LITHIUM ION SECONDARY BATTERY

CROSS-REFERENCE TO RELATED APPLICATION

This application claims priority to and the benefit of Korean Patent Application No. 10-2005-0134533, filed on Dec. 29, 2005, the entire content of which is incorporated herein by reference.

BACKGROUND OF THE INVENTION

1. Field of the Invention

The present invention relates to a cylindrical lithium ion secondary battery, and more particularly, to a cylindrical lithium ion secondary battery having a inexpensive center pin while preventing metal leaching in the electrolyte.

2. Description of the Prior Art

Typically, a cylindrical lithium ion secondary battery includes a cylindrical electrode assembly, to which a center pin is fitted, an electrolyte contained in the electrode assembly, a cylindrical case for receiving the electrode assembly and the electrolyte, and a cap assembly assembled to the top opening of the cylindrical case for sealing the cylindrical case.

The electrode assembly includes a positive electrode plate coated with a positive active material, a negative electrode plate coated with a negative active material, and a separator interposed between the positive electrode plate and the negative electrode plate such that an electrical short circuit is prevented and only the movement of lithium ions is allowed. The positive electrode plate, the negative electrode plate and the isolator are wound substantially in a cylindrical form. A positive electrode tab connects the positive electrode plate to the cap assembly, and a negative electrode tab connects the negative electrode plate to the case.

Since such cylindrical lithium ion secondary batteries have a capacity of about 2,000 to 2,800 mAh, they are usually used in notebook computers, digital cameras, camcorders, or the like, which require a large capacity of power. Those secondary batteries are assembled and typically used in the form of a battery pack, in which the batteries are connected in series and/or in parallel according to a required level of voltage or power, and a safety device is provided in the battery pack.

Such a cylindrical lithium ion secondary battery may be fabricated in the following manner.

First, a positive electrode plate which is coated with a positive active material and to which a positive tab is connected, a negative electrode plate which is coated with a negative active material and to which a negative electrode tab is connected, and a separator are laminated and then wound substantially in a cylindrical form, thereby fabricating an electrode assembly. Then, the electrode assembly is introduced into a cylindrical case and a tab is connected to a cap assembly. Electrolyte is then poured into the case, and the cap assembly is assembled to the case, thereby finishing a cylindrical lithium ion secondary battery.

However, the above-mentioned cylindrical lithium ion secondary battery has a problem in that heat is produced by a chemical reaction in the battery when the battery is charged or discharged and such heat may ignite or fracture the battery. Therefore, it becomes necessary to maintain thermal stability for such a cylindrical lithium ion secondary battery by developing a structure capable of dissipating heat produced in the battery to the outside of the battery. Recently, a substantially cylindrical center pin is inserted through the central area of the electrode assembly so that the electrode assembly is not deformed during charging or discharging of the lithium ion secondary battery.

The electrode assembly received in the case is formed with a space at the central area thereof. Such a space formed as a shaft for winding is extracted, wherein the shaft is used when a positive electrode plate and a negative electrode plate are wound with a separator interposed between the positive electrode plate and the negative electrode plate. A cylindrical center pin is inserted into this space. Such a center pin is typically formed by cylindrically rolling up a metal sheet. If the center pin is formed in this manner, a slit having a width is formed in the overlapped portions of the sheet. In order to prevent the formation of such a slit, the center pin may be occasionally fabricated in a one-piece cylindrical form from the beginning.

Stainless steel (SUS) is typically used as a material of such a center pin. Such material prevents the oxidization of the center pin as well as preventing the center pin from leaching in the form of ions in the electrolyte. However, SUS has a disadvantage in that its price is very expensive. Therefore, a need exists for the prevention of leaching in the electrolyte even if a relatively inexpensive metal instead of SUS is used for fabricating such a center pin.

SUMMARY OF THE INVENTION

In accordance with the present invention a cylindrical lithium ion secondary battery is provided having a center pin which, while substantially retaining the function of a conventional center pin, is formed from an inexpensive metal such that the manufacturing costs of the center pin can be reduced. In particular, the center pin is fabricated from steel, copper (Cu) or galvanized iron rather than SUS as used in a conventional center pins, the center pin being coated with a polymer or other metal on the outer surface thereof so that metal leaching in the electrolyte can be prevented.

In accordance with an exemplary embodiment a cylindrical lithium ion secondary battery includes an electrode assembly having a center pin inserted through the center of the electrode. A case is provided for housing the electrode assembly and an electrolyte. A cap assembly seals the case. The center pin includes a body formed from a metallic material, and a coating layer formed on the surface of the body.

The body may be formed from one selected from steel, Cu and galvanized iron.

The coating layer may be formed from a polymer, which is one selected from polyethylene (PE), polypropylene (PP), polyethylene terephthalate (PET), and polyvinylidene fluoride (PVDF) 761.

The coating layer may be formed from a metal, and especially the coating layer may be formed from nickel.

The center pin may have a tubular body which is formed with a longitudinal slit, portions of the tubular body, which are positioned opposite to each other and define the longitudinal slit, being directed toward the inside of the center pin, and the center pin may be formed with tapers at its top and bottom ends.

The center pin may be formed in a cylindrical one-piece unit, and may be closed at the upper and bottom ends of the cylindrical body by caps, which are formed from one selected from PE, PP, PET and PVDF 761.

BRIEF DESCRIPTION OF THE DRAWINGS

FIG. 3b is a cross-sectional view taken along line B-B in FIG. 3a.

FIG. 4b is a cross-sectional view taken along line C-C in FIG. 4a.

FIG. 5b is a cross-sectional view taken along line D-D in FIG. 5a.

DETAILED DESCRIPTION

Figure 1:
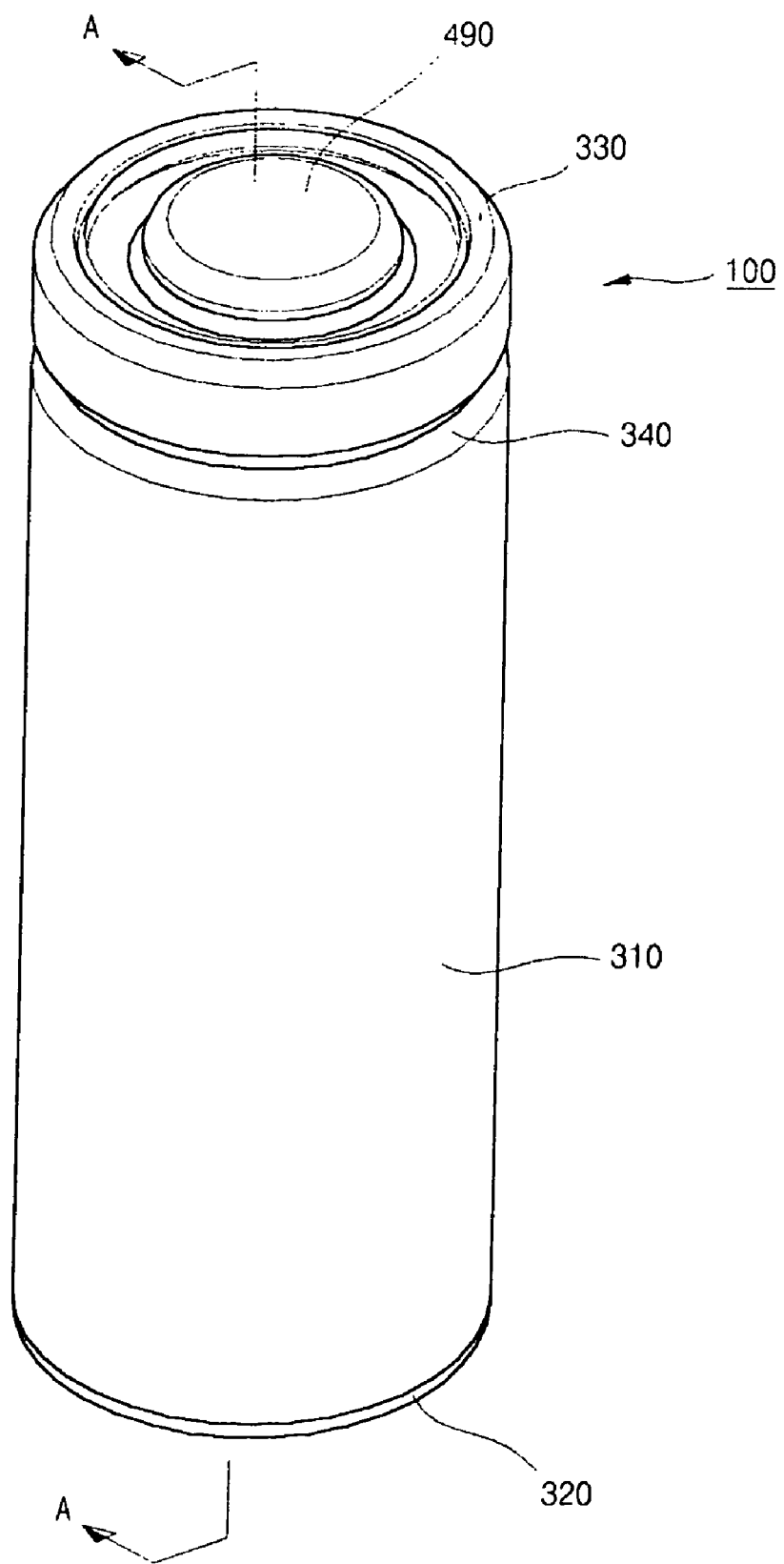
FIG. 1 is a perspective view of a cylindrical lithium ion secondary battery according to an embodiment of the present invention.
Figure 2:
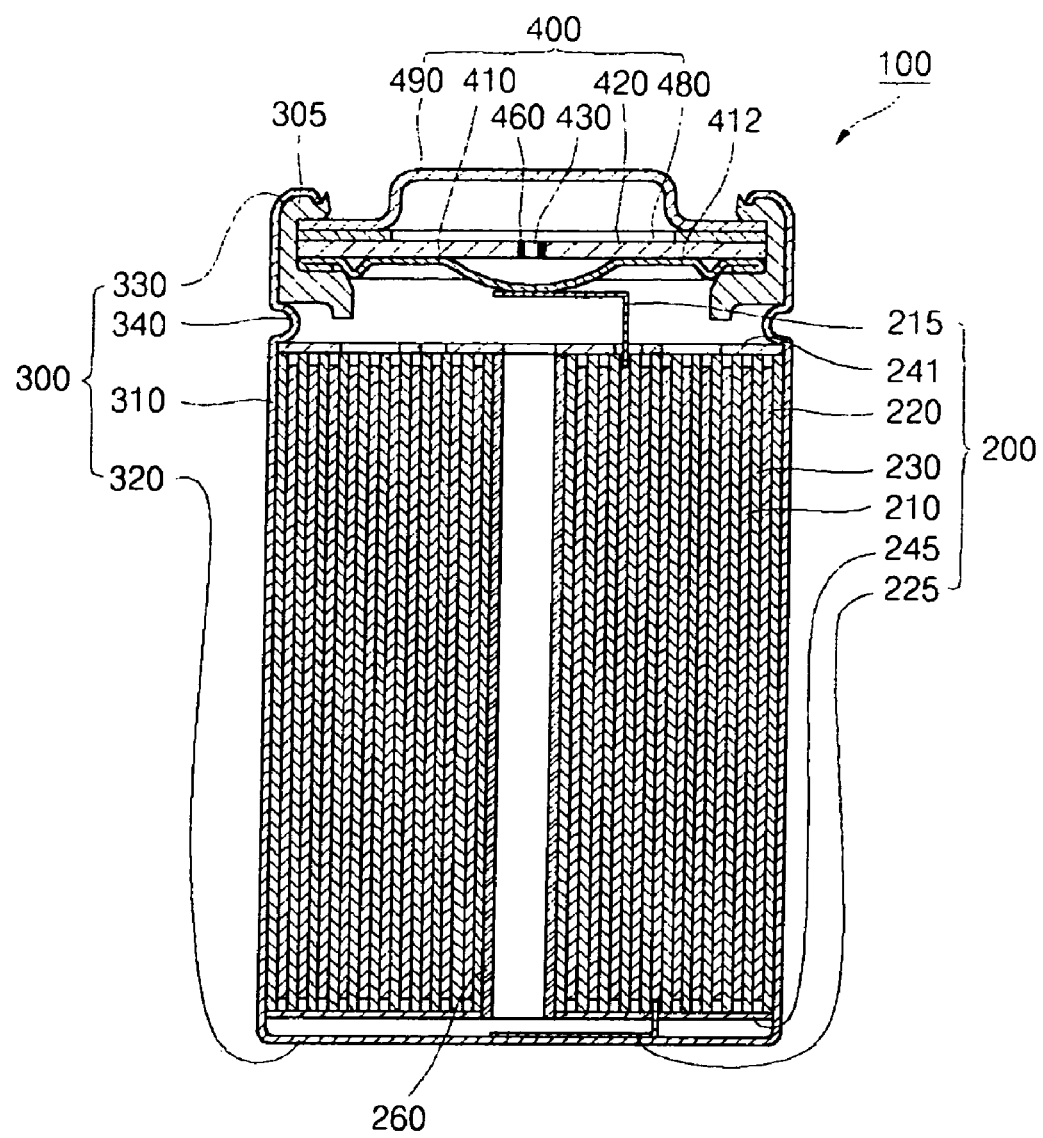
FIG. 2 is a cross-sectional view taken along line A-A in FIG. 1.

Referring to FIGS. 1 and 2, the inventive cylindrical lithium ion secondary battery 100 includes an electrode assembly 200, through which a center pin 260 is inserted, a cylindrical case 300 for receiving the electrode assembly 200 and electrolyte (not shown). A cap assembly 400 is assembled to the top of the cylindrical case 300, thereby sealing the cylindrical case 300, the cap assembly 400 allowing current produced in the electrode assembly to flow to an external apparatus.

The electrode assembly 200 includes a positive electrode plate 210 having a positive current collector, the surface of which is coated with a positive active material, a negative electrode plate 220 having a negative current collector, the surface of which is coated with a negative active material, and a separator 230 interposed between the positive electrode plate 210 and the negative electrode plate 220, thereby electrically insulating the positive electrode plate 210 and the negative electrode plate 220 from one another. The positive electrode plate 210, the negative electrode plate 220 and the separator 230 are rolled up in a jelly-roll shape.

Although not shown in the drawings, the positive plate 210 may include a positive current collector which is formed from a highly conductive metal sheet, for example, an aluminum (Al) foil, and positive active material layers coated on the opposite sides of the positive current collector. The positive electrode plate 210 may be formed with positive current collector regions, on which no positive active material layer is formed, i.e., positive uncoated regions. A positive electrode tab 215 may be adhered to one end of the uncoated regions, wherein the positive electrode tab 215 is usually formed from an Al material and protrudes above the top end of the electrode assembly 200 by a predetermined length.

In addition, the negative plate 220 may include a negative current collector which is formed from a conductive metal sheet, for example, a Cu or nickel (Ni) foil, and negative active material layers coated on the opposite sides of the negative current collector. The negative electrode plate 220 may be formed with negative current collector regions, on which no negative active material layer is formed, i.e., negative uncoated regions. A negative electrode tab 225 may be adhered to one end of the uncoated regions, wherein the negative electrode tab 225 is usually formed from a Ni material and protrudes below the bottom end of the electrode assembly 200 by a predetermined length. In addition, insulation plates 241, 245 may be further provided on the top and bottom sides of the electrode assembly 200, respectively, so as to prevent the electrode assembly 200 from coming in contact with the cap assembly 400 or the cylindrical case 300.

The cylindrical case 300 has a cylindrical side plate 310 having a predetermined diameter so as to form a space capable of receiving the cylindrical electrode assembly 200, and a bottom plate 320 for sealing the bottom portion of the cylindrical side plate 310. The top portion of the cylindrical side plate 310 is opened for allowing the insertion of the electrode assembly 200. As the negative electrode tab 225 of the electrode assembly 200 is adhered to the center of the bottom plate 320 of the cylindrical case 300, the cylindrical case 300 may serve as a negative pole. The cylindrical case 300 is typically formed from Al, iron (Fe) or alloys thereof. In addition, a crimping portion 330, which is inwardly bent, is formed on the top end of the cylindrical case 300 so as to compress the top portion of the cap assembly 400 which is fitted in the top opening of the cylindrical case 300. A beading portion 340, which is inwardly recessed, is also formed at a position spaced below from the crimping portion 330 by a distance corresponding to the thickness of the cap assembly 400 so as to compress the bottom part of the cap assembly 400.

The cap assembly 400 includes a safety vent 410, a current interrupting device 420, a secondary protection element 480, and a cap-up 490. The safety vent 410 is flat and has a projection which projects downward at the center thereof. The safety vent 410 is positioned under the cap assembly 400, wherein the projection may be deformed upward by the pressure occurring in the secondary battery. At a predetermined position on the bottom side of the safety vent 410, the positive electrode tab 215 extends from one of the positive electrode plate 210 and is welded so as to electrically interconnect the safety vent 410 and the positive electrode plate 210. The negative electrode tab 225 extends from the negative electrode plate 220 and is welded so as to interconnect the bottom plate 320 to the negative electrode plate 220. A current interrupting means 420 may be additionally provided on the top of the safety vent 410, so that the current interrupting means 420 is fractured when the safety vent 410 is deformed, thereby interrupting current. When the internal pressure of the case 300 is increased, the safety vent 410 may be deformed or fractured, thereby contributing to the fracturing of the current interrupting device 420. In addition, a secondary protective element 480 may be additionally provided on the top of the current interrupting means 420 so as to interrupt current when over-current flows. A conductive cap-up 490 may be additionally provided on the top of the secondary protective element so as to provide positive or negative voltage to the outside.

Center pin 260 is inserted in the central area of the electrode assembly 200 for the following reasons:

a) Since the lithium ion secondary battery is repeatedly charged and discharged, the electrode assembly 200 is expanded. However, since the electrode assembly 200 is confined by the case 300 on the outside, the electrode assembly 200 can only expand toward the central area thereof, thereby deforming the electrode plates. As a result, the life span of the secondary battery can be reduced and electrical short circuits may occur. The center pin 260 thereby functions to prevent such deformation of the electrode plates.

b) If the inside of the battery reaches a high temperature due to overcharge or the like, a great amount of gas is produced in the inside of the battery. In such a case, the center pin 260 serves as a gas discharge passage, thereby preventing abrupt explosion of the battery. Such a center pin 260 is typically formed by rolling up a thin metal sheet in a cylindrical form in consideration of the manufacturing costs and gas discharge efficiency. Therefore, a slit is formed at the overlapped portions of the metal sheet. In order to prevent the formation of such a slit, the center pin may be occasionally formed in a one-piece cylindrical form.

Figure 3A:
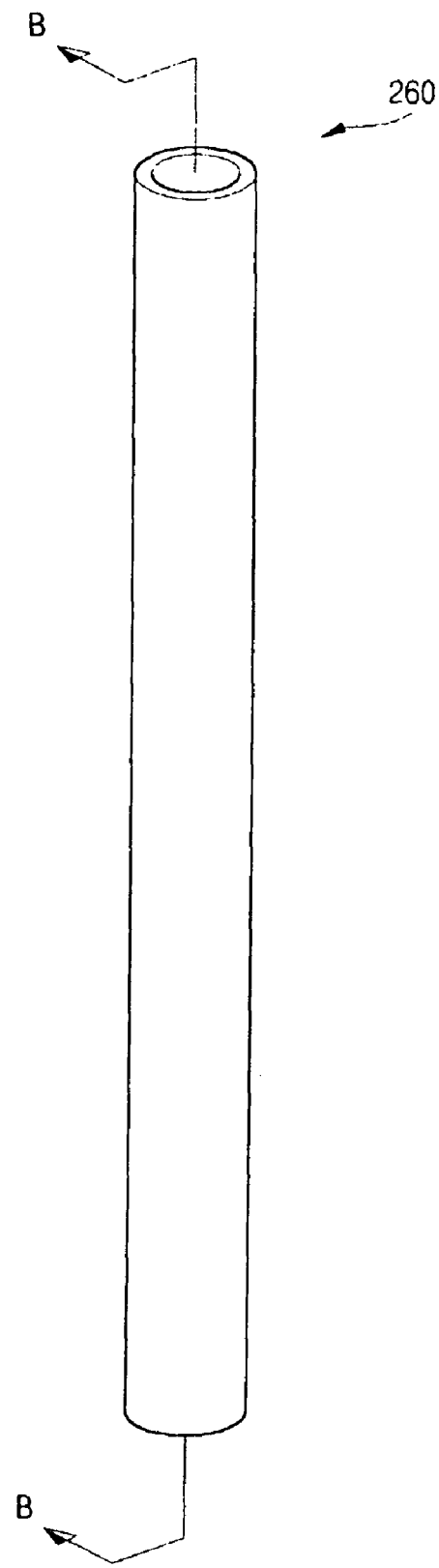
FIG. 3a is a perspective view of a center pin according to an embodiment of the present invention.
Figure 3B:
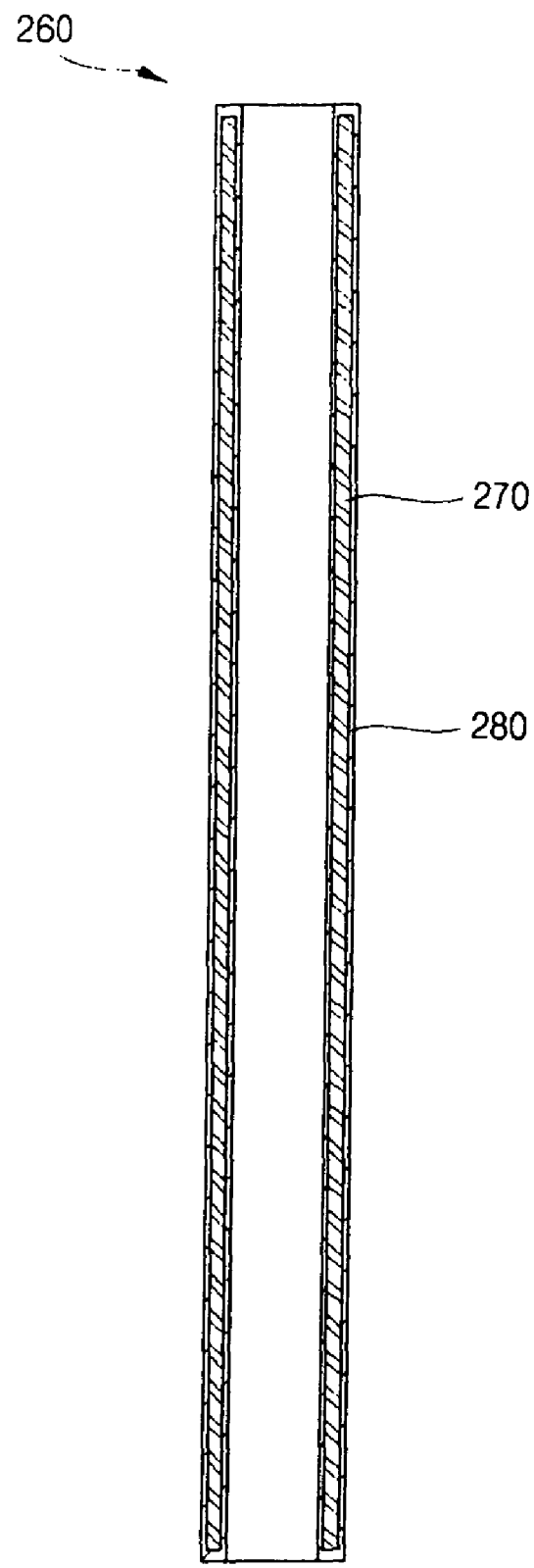

Referring to FIGS. 3a and 3b, the center pin 260 of the exemplary inventive cylindrical lithium ion battery embodiment may include a body 270 formed from a metallic material and a coating layer 280 coated on the entire surface of the body. Here, the body 270 may be formed from one selected from steel, Cu, galvanized iron or the equivalent but is not limited to such materials.

Existing center pins are typically formed from SUS. SUS is corrosion-resistant steel and classified into iron-chrome based ferrite SUS and iron-nickel-chrome based austenite SUS. The ferrite SUS is made by adding molten Cr into body-centered cubic (BCC) crystals, which are the crystal system of iron in room temperature, wherein when the ferrite SUS is oxidized, oxidation layers of both iron and chrome are formed on the surfaces, thereby protecting the inner portion. The ferrite SUS has ferromagnetism. The austenite SUS is made by adding a large quantity of Ni and chrome (Cr) to face-centered cubic (FCC) crystals, which are the crystal system of iron at a temperature of 900 to 1400° C. and stabilizing them at a room temperature. The austenite SUS has paramagnetism.

Because the center pin may typically come into contact with the bottom plate 320 of the case, to which the negative tab 225 is welded, current may flow to the center pin if the center pin is formed from a metallic material. Therefore, a metal leaching phenomenon may occur within electrolyte. Because SUS is corrosion-resistant, the metal leaching phenomenon can be prevented. However, steel, Cu and galvanized iron may be subjected to the leaching phenomenon after most of lithium ions, which have been adsorbed to the negative active material, are desorbed under a special circumstance, i.e., under an over-discharge condition.

However, SUS has a disadvantage of being expensive because chrome, which is expensive, is used as an alloy component of SUS. Therefore, if such a center pin is formed from SUS, the manufacturing costs will be high, as a result of which the manufacturing costs for a cylindrical lithium ion secondary battery are also increased. Whereas, steel, Cu, galvanized iron or the equivalent are considerably inexpensive as compared to SUS, although they have a disadvantage in that metal leaching may occur when they are positioned in electrolyte. Galvanized iron is also called tin plate, which means an iron plate coated with tin (Sn). In general, Sn is a metal which has an ionization tendency greater than that of iron. Therefore, Sn coated on an iron plate may completely protect the iron. However, if the Sn peels off, the corrosion of the iron may be facilitated.

In accordance with an exemplary embodiment of the present invention, the body 270 of the center pin 260 is formed from steel, Cu, galvanized iron or the equivalent, which are inexpensive as compared to SUS, and a coating layer 280 of a predetermined thickness is formed on the body 270, so that the metal leaching of the body 270 in the electrolyte can be prevented. Here, the coating layer 280 may be formed from a polymer.

Any one of PE, PP, PET, PVDF 761, and the equivalent may be, but not exclusively, selected as the polymer. Because PE has a low density and its molecules are not sufficiently arranged, it is superior in ductility, whereby it can be easily formed. In addition, because PE is formed only by $CH_2$ groups, its electric insulation property is excellent. Moreover, as can be seen from its structural formula, PE is symmetrical about a carbon (C) chain. Therefore, PE is excellent as an insulation material. PE has a melting point of about 130° C., although there may be a larger or smaller deviation depending on the type of PE. PP has an isotactic structure, in which methyl groups are arranged in an identical direction. The melting point is about 165° C. PET is a saturated polyester, which is obtained through polycondensation of terephthalic acid and ethylene glycol, and is excellent in heat resistance.

The coating layer 280 may be formed from metal, for example by plating nickel (Ni). Nickel coating is corrosion-resistant and thus prevents the metal leaching of the body 270 in electrolyte.

Figure 4A:
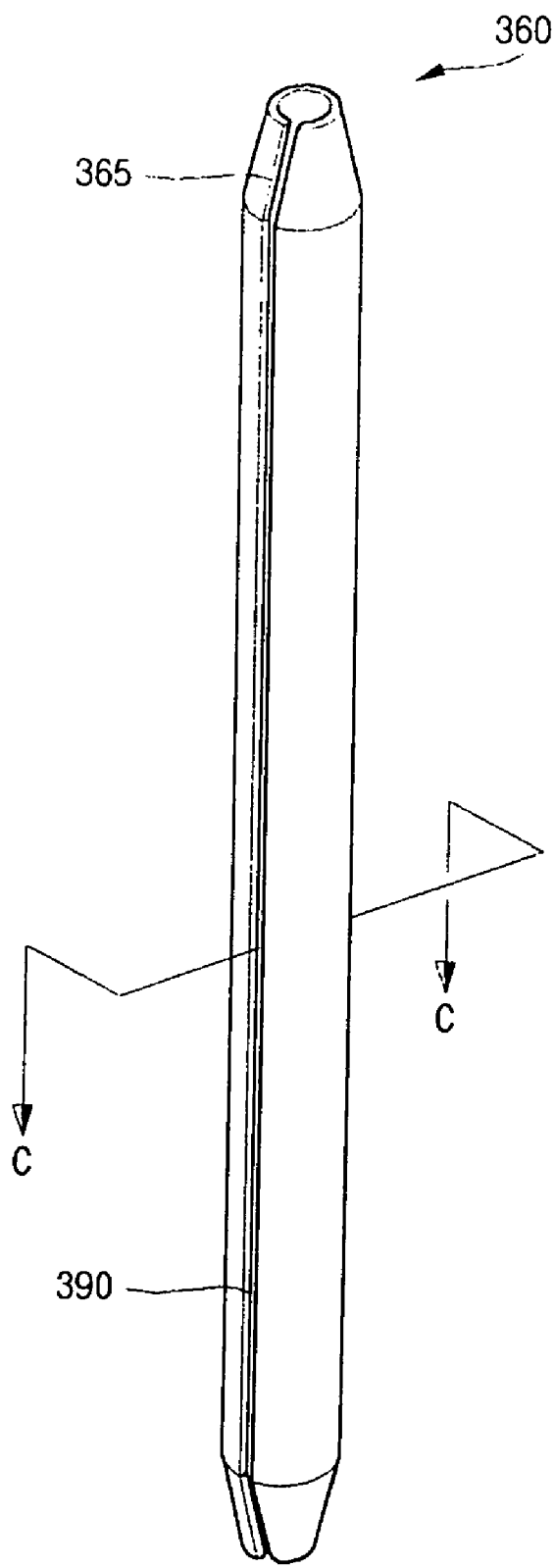
FIG. 4a is a perspective view of a center pin according to another embodiment of the present invention.
Figure 4B:
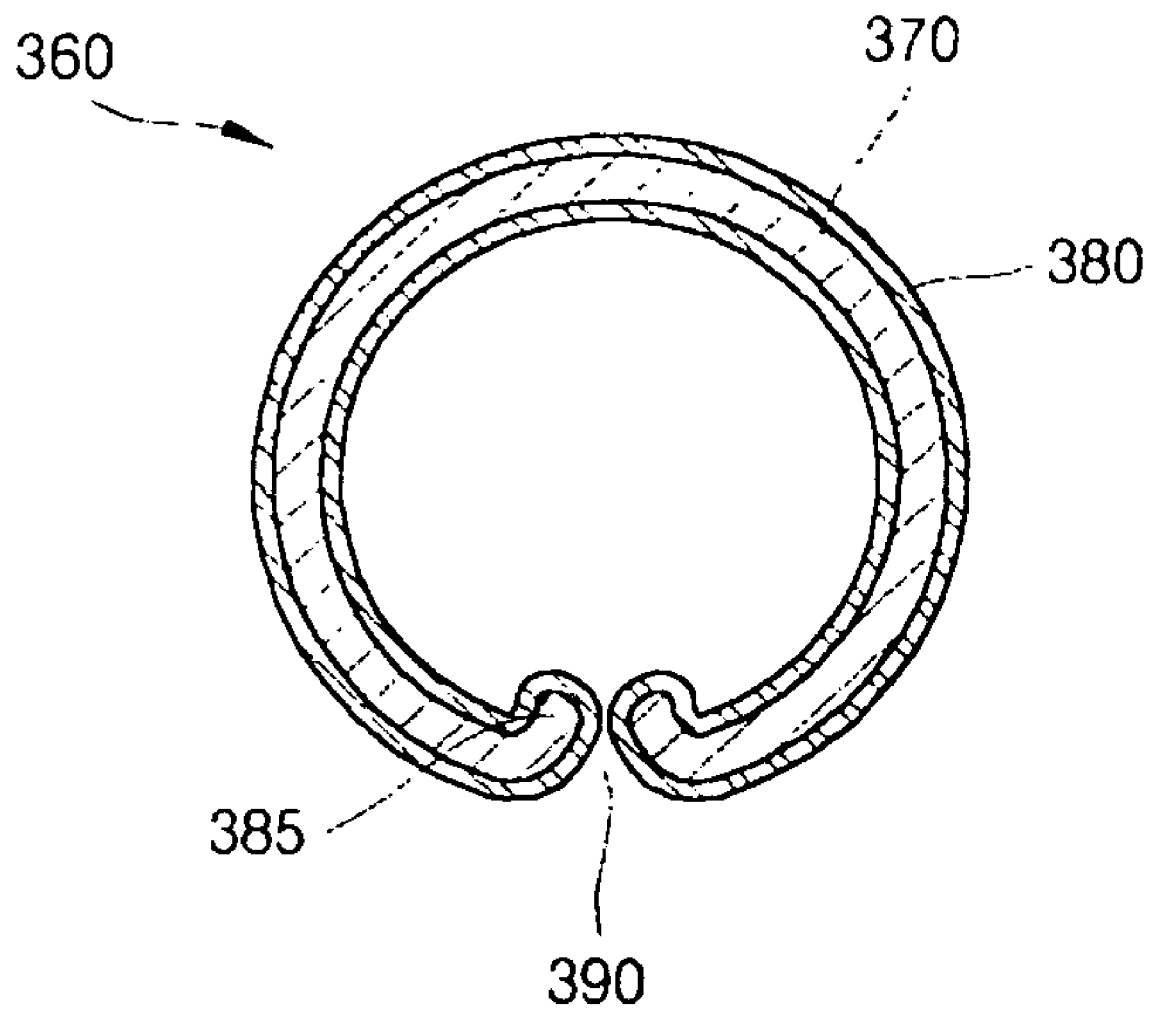

Referring to FIGS. 4a and 4b, a center pin 360 according to another embodiment of the present invention, has a tubular body 370 which has a longitudinal slit 390, and the opposite ends 385 defining the slit 390 may be oriented toward the inside of the center pin 360. Similarly, the body 370 may be formed from material selected from steel, Cu, galvanized iron or the equivalent, and the surface on the body 370 may be coated with a coating layer 380, which is formed from material selected from polymers such as PE, PP, PET or PVDF 761, metal such as Ni, or an equivalent thereof. Therefore, the metal leaching in electrolyte of the body 370 may be prevented.

Such a center pin may be formed from a plastic or metallic material in a Pointless structure from the beginning. However, such a center pin is typically formed by rolling up a metallic plate, which is easily manipulated, in a cylindrical form and forming a slit 390 between the opposite ends 385 of the rolled plate so as to reduce the costs as well as to assure smooth gas discharge. The opposite ends 385 defining the slit 390 are inwardly bent, so that even if the center pin 360 is deformed by an external impact, the opposite ends 385 are deformed toward the inside of the center pin 360, thereby preventing an electrical short circuit.

The top and bottom ends of the center pin 360 may be formed with tapers 365, respectively. As such, if the center pin 360 is deformed by an external impact, the top and bottom ends of the center pin 360 may be relatively easily deformed as compared to the longitudinal central area of the center pin 360. In order to minimize the deformation, the tapers 365, each of which has a diameter gradually decreasing in the direction away from the central area, are formed at the longitudinal opposite ends.

Figure 5A:
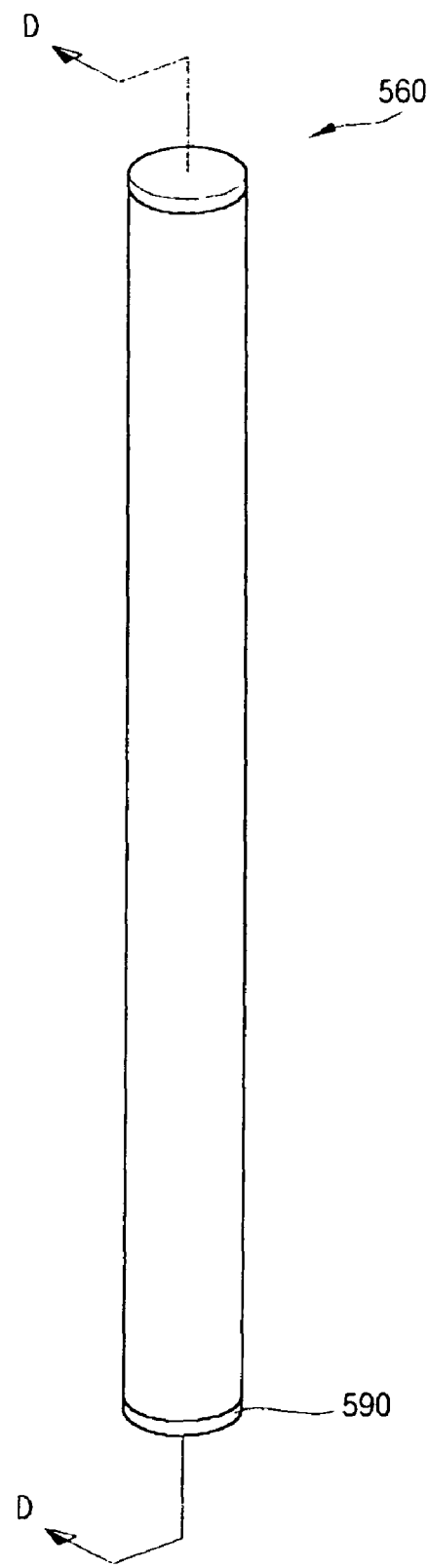
FIG. 5a is a perspective view of a center pin according to another embodiment of the present invention.
Figure 5B:
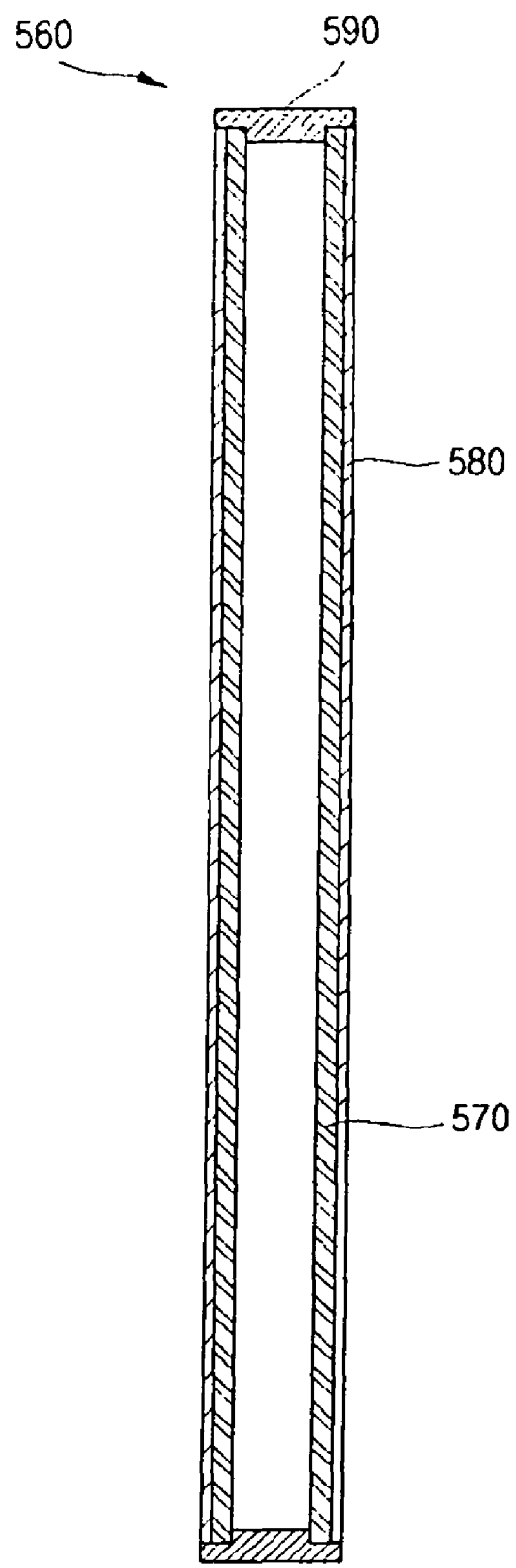

Referring to FIGS. 5a and 5b, a center pin 560 according to another embodiment of the present invention has a cylindrical body 570, which is formed in a cylindrical one-piece unit, and the top and bottom ends of which are closed by caps 590, respectively. Likewise, the body 570 may be formed from material selected from steel, Cu, galvanized iron or an equivalent thereof, and the surface of the body 570 is covered by a coating layer 580, which may be formed from a polymer such as PE, PP, PET, PVDF 761 or the like, metal such as Ni, or an equivalent thereof. Therefore, the metal leaching in electrolyte from the body 570 can be prevented.

The caps 590 may be formed from material selected from PE, PP, PET, PVDF 761 or an equivalent thereof. The caps 590 are molten or fractured when the internal temperature of the battery reaches about 80° C. or more, thereby the top and bottom ends of the body 570 of the center pin 560 may be opened. That is, the top and bottom ends of the body 570 communicate with each other. In this manner, at the initial stage of overcharge, because the top and bottom ends of the body 570 are closed, void volume is greatly reduced, thereby allowing the safety vent 410 and the current interrupting means 420 to be quickly operated. However, when the internal temperature of the battery arrives at a high temperature (for example, 80° C. or more), the battery is directly exposed to the danger of explosion and ignition. In that event, the closed center pin 560 loses its original meaning as a center pin and would serve as a chimney. That is, as cyclo-hexane benzene (CHB), biphenyl, etc., which are contained in electrolyte, are decomposed, gas is produced. Therefore, it is more desirable to cause such gas to concentrate to the safety vent 410 along the body 570 of the center pin 560 in view of the safety of the battery.

As described above, according to the exemplary cylindrical lithium ion secondary battery embodiments, steel, Cu, galvanized iron or an equivalent thereof, which is relatively inexpensive, is used for fabricating a center pin instead of SUS, and a coating layer, which is formed from polymer, metal or an equivalent, is coated on the surface of the center pin so as to prevent metal leaching in electrolyte. As a result, it is possible to considerably reduce the fabricating costs for a center pin, which is capable of exhibiting an identical function as the conventional center pins.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A cylindrical lithium ion secondary battery comprising:
   an electrode assembly having a center pin inserted through a center of the electrode assembly;
   a case housing the electrode assembly; and
   a cap assembly sealing the case,
   wherein the center pin includes a body formed from a metallic material and has a coating layer formed on an entire inner and outer surface of the body, and
   wherein the coating layer consists essentially of nickel.

2. The cylindrical lithium ion secondary battery as claimed in claim 1, wherein the metallic material comprises steel, copper and/or galvanized iron.

3. The cylindrical lithium ion secondary battery as claimed in claim 1, wherein the center pin has a tubular shape and has a longitudinal slit, portions of the center pin being positioned opposite to each other and defining the longitudinal slit, the longitudinal slit being directed toward an inside of the center pin.

4. The cylindrical lithium ion secondary battery as claimed in claim 3, wherein the center pin is formed with tapers at a center pin top end and at a center pin bottom end.

5. The cylindrical lithium ion secondary battery as claimed in claim 1, wherein the center pin is formed as a cylindrical one-piece unit.

6. The cylindrical lithium ion secondary battery as claimed in claim 5, wherein the center pin is closed at a center pin top end and at a center pin bottom end by caps.

7. The cylindrical lithium ion secondary battery as claimed in claim 6, wherein the caps are foamed from material comprising polyethylene, polypropylene, polyethylene terephthalate, or polyvinylidene fluoride 761.

8. A method of preventing metal leaching in an electrolyte of a cylindrical lithium ion secondary battery, the cylindrical lithium ion secondary battery having an electrode assembly with a center pin inserted through a center of the electrode assembly, a case housing the electrode assembly and the electrolyte, and a cap assembly sealing the case, the method comprising:
   foaming the center pin to have a metallic material body; and
   forming a coating layer on an entire inner and outer surface of the metallic material body,
   wherein the coating layer consists essentially of nickel.

9. The method as claimed in claim 8, wherein metallic material body is formed from steel, copper and/or galvanized iron.

\* \* \* \* \*

UNITED STATES PATENT AND TRADEMARK OFFICE
CERTIFICATE OF CORRECTION

| | | |
|---|---|---|
| PATENT NO. | : 7,811,697 B2 | Page 1 of 1 |
| APPLICATION NO. | : 11/647048 | |
| DATED | : October 12, 2010 | |
| INVENTOR(S) | : Yooeup Hyung et al. | |

It is certified that error appears in the above-identified patent and that said Letters Patent is hereby corrected as shown below:

In the Claims

Column 8, Claim 7, line 15   Delete "foamed"
                              Insert -- formed --

Column 8, Claim 8, line 25   Delete "foaming"
                              Insert -- forming --

Signed and Sealed this

Thirty-first Day of January, 2012

David J. Kappos
*Director of the United States Patent and Trademark Office*